United States Patent
Ryckebusch et al.

[19]

[11] Patent Number: 6,019,917
[45] Date of Patent: Feb. 1, 2000

[54] METHOD FOR CONTROLLING AN INJECTION MOULDING PRESS

[75] Inventors: Marc Ryckebusch, Annoeullin; José Pabiot, Paris; Fabrice Laurent, Faumont, all of France

[73] Assignee: Transvalor S.A., Sophia Antipolis, France

[21] Appl. No.: 09/029,843

[22] PCT Filed: Jul. 9, 1997

[86] PCT No.: PCT/FR97/01245

§ 371 Date: Mar. 9, 1998

§ 102(e) Date: Mar. 9, 1998

[87] PCT Pub. No.: WO98/01282

PCT Pub. Date: Jan. 15, 1998

[30] Foreign Application Priority Data

Jul. 9, 1996 [FR] France .................................. 96 08526

[51] Int. Cl.⁷ .................................................. B29C 45/77
[52] U.S. Cl. .................... 264/40.1; 264/40.5; 264/328.1; 425/145; 425/149
[58] Field of Search ................................ 264/40.1, 40.4, 264/40.5, 40.6, 40.7, 328.1; 425/140, 141, 144, 145, 147, 148, 149

[56] References Cited

U.S. PATENT DOCUMENTS

| | | | |
|---|---|---|---|
| 3,642,404 | 2/1972 | Nagawa ................................ | 425/145 |
| 3,741,700 | 6/1973 | Hutchinson et al. ................... | 425/149 |
| 3,893,792 | 7/1975 | Laczko .................................. | 425/149 |
| 4,758,389 | 7/1988 | Lampl .................................. | 264/40.1 |
| 4,816,197 | 3/1989 | Nunn .................................... | 264/40.1 |
| 4,833,910 | 5/1989 | Kenmochi . | |
| 5,017,315 | 5/1991 | Kumazaki ............................. | 264/40.1 |
| 5,356,575 | 10/1994 | Krosse et al. ......................... | 264/40.5 |

FOREIGN PATENT DOCUMENTS

| | | |
|---|---|---|
| 0 193 719 | 9/1986 | European Pat. Off. . |
| 0 737 560 | 10/1996 | European Pat. Off. . |
| 2 324 441 | 4/1977 | France . |
| 32 11 728 | 10/1982 | Germany . |
| 41 08 992 | 9/1991 | Germany . |
| 61-237616 | 10/1986 | Japan . |
| 1-320126 | 12/1989 | Japan . |
| 2-128822 | 5/1990 | Japan . |
| 2-208016 | 8/1990 | Japan . |
| 3-266622 | 11/1991 | Japan . |
| 6-218780 | 8/1994 | Japan . |
| 7-276460 | 10/1995 | Japan . |

OTHER PUBLICATIONS

"Viskositatsregelung beim Spritzgiessen", *Kunststoffberater*, vol. 23, No. 11, Nov. 1978, pp. 632–633.

Primary Examiner—Jill L. Heitbrink
Attorney, Agent, or Firm—Young & Thompson

[57] ABSTRACT

A method for controlling an injection moulding press, wherein the injection process is controlled by controlling the injection force, is disclosed. According to the method, the mass (m) of a moulded product is correlated with the viscosity (n) and either the pressure ($P_m$) of the material in the mould or the injection pressure ($P_h$), the resulting correlations are processed to define an analytical model expressing the mass (m) of the moulded product in relation to the operating parameters, an injection force control law is derived from the analytical model on the basis either of the pressure ($P_m$) of the material in the mould or of the injection pressure ($P_h$), and the press injection force is controlled on the basis of the analytical model.

9 Claims, 4 Drawing Sheets

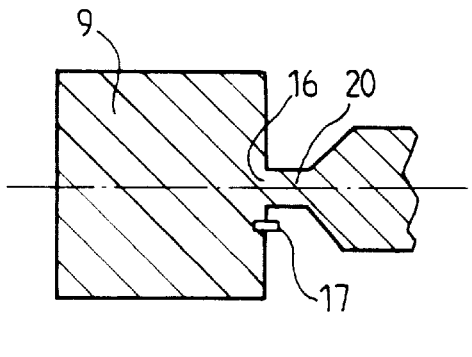
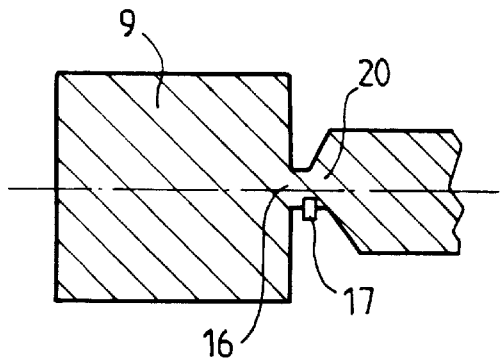
FIG. 8  FIG. 9
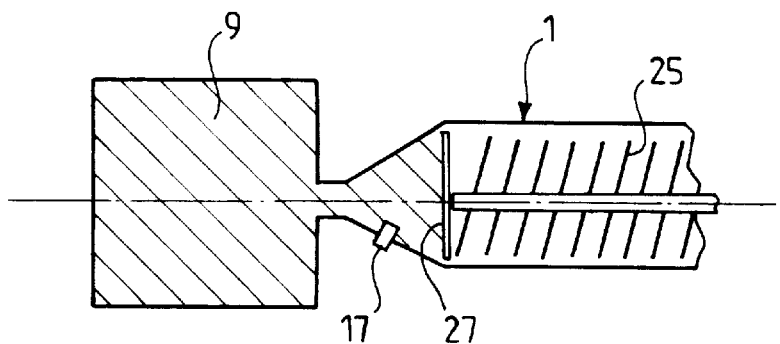
FIG. 10

METHOD FOR CONTROLLING AN INJECTION MOULDING PRESS

FIELD OF THE INVENTION

The present invention relates to a method for controlling regulation of a hydraulic press intended for injection moulding, particularly of polymers.

BACKGROUND OF THE INVENTION

The presses used in the domain of moulding are usually actuated by a piston which moves either under the action of a hydraulic fluid under pressure, so that the pressure of injection exerted on the material to be moulded is a function of the hydraulic pressure exerted upstream of the piston of the press, or under the action of a force generated by mechanical or electrical means.

Furthermore, it is known that numerous parameters influence the value of the pressure applied to the material inside the mould. In practice, the presses of the prior state of the art comprise means for controlling the hydraulic pressure applied to the piston and means for measuring the pressure of the material inside the mould where the injection is effected. It is also known that, in stable operating conditions of the injection press, by simply regulating the pressure of the hydraulic fluid, the pressure of the material inside the mould can thus be maintained within a range, satisfactory in certain cases, despite the influence of all the technical parameters which have influence thereon, particularly the operating parameters of the machine.

Such constant and regular operating conditions of the injection press are maintained as long as no noteworthy disturbance occurs. Among the disturbances that may modify the operating conditions of the press may be retained, in particular, the stoppages thereof, whether they be necessary for normal operation of the machine or whether they be accidental, as well as the influence exerted by the variations in temperature or the irregularity of the material itself if a recycled material is used. When such disturbances occur during a cycle of injection, it is known that it is necessary to make the installation operate thereafter for a more or less long period of time, which depends on the characteristics of the press and the material to be moulded, before resuming new stable operating conditions. Moreover, the level of these new stable operating conditions may be very different from the earlier level of stability, which is translated by very different characteristics of moulded products.

During the operating time of the press under disturbed conditions, a certain number of pieces are, of course, produced which, for the majority, do not fulfill the specifications imposed, particularly concerning their mass and/or their dimensions, with the result that such pieces are discarded, which represents both a loss of time and of money.

SUMMARY OF THE INVENTION

The present invention has for its object to overcome these drawbacks by proposing a means for reducing the deviation which exists between the mass, or the dimensions, of products respectively obtained before and after a disturbance.

The present invention thus makes it possible to reduce the number of pieces discarded due to too great differences in their mass, and/or in their dimensions, with respect to the ranges of tolerances admitted. Due to the reduction of the deviation mentioned above, the moulder has the possibility of taking as reference level of a production the value corresponding to the lowest value of the range of tolerances on the mass of a product, which enables him to make substantial savings on the quantity of material used.

The present invention thus has for its object a method for controlling and regulating an injection moulding press, particularly of polymers, which is actuated by means adapted to exert on the material to be moulded a force, called injection force, which essentially comprises two phases, namely a filling phase during which the material to be moulded is introduced in the mould, which is followed by a phase of maintenance under pressure, during which a determined pressure is applied to the material, characterized in that it comprises the steps of:

establishing respective relations of correlation between the mass, and/or at least one of the dimensions, of a product moulded with at least certain operating parameters of the press, namely on the one hand the viscosity of the material in the mould, or a parameter correlated therewith, and on the other hand, either the pressure of the material in the mould, or the pressure of injection generating the force of injection, effecting a processing, particularly statistical, of these different correlation relations, in order to define an analytical model expressing the mass, and/or said dimension, of the moulded product as a function of said operating parameters, deriving from said analytical model a force control law which must be applied by the press to the material contained in the mould during the phase of maintenance wider pressure as a function either of the pressure of the material in the mould, or of the pressure of injection, measuring at each cycle of injection the operating parameters of the press, namely on the one hand the viscosity of the material in the mould or a parameter correlated therewith, and, on the other hand, either the pressure of the material in the mould, or the injection pressure generating the force of injection, controlling the force of maintenance applied by the press to the material during the phase of maintenance under pressure from this analytical model.

In an embodiment of the invention, the steps of establishment of said respective relations of correlation, of production of said statistical processing of these different relations of correlation, and of establishment of said law of control of the force of injection are effected prior to the moulding operations. The operations for measuring the operating parameters of the press are effected during the phase of filling.

In an embodiment of the invention, an additional operating parameter is taken into account in said steps, namely the temperature of the tools.

In another embodiment of the invention, the mass of moulded products, and/or at least a dimension thereof, is controlled during the moulding operation, a relation of correlation is established between the variation of the mass of these products, and/or said dimension, with respect to a reference value, with either the pressure of the material in the mould, or the injection pressure, so as to bring to the law for controlling the force of maintenance a tern of correction.

The present invention also has for its object a device for controlling and regulating an injection moulding press, particularly of polymers, which is actuated by means adapted to exert on the material to be moulded a force, called injection force, so as to carry out a filling phase during which the material is introduced in the mould via an injection nozzle, followed by a phase of maintenance under pressure during which a determined pressure is applied to the material, characterized in that it comprises means for detecting the end of filling phase, adapted to set the phase of maintenence under pressure to work.

This device may comprise delay means triggered off by the means for detecting the end of filling phase, and which are adapted to set the phase of maintenance under pressure to work.

The pressure of the material is preferably measured inside the mould in which the injection is effected, particularly in a zone thereof close to a point of injection. This measure of pressure may also be effected upstream of the mould, inside the injection nozzle, in a zone thereof close to the outlet.

BRIEF DESCRIPTION OF THE DRAWINGS

Various embodiments of the present invention will be described hereinafter by way of non-limiting examples, with reference to the accompanying drawings, in which:

FIGS. 8 to 10 are partial views in section of three variant embodiments of the invention.

DETAILED DESCRIPTION OF THE INVENTION

Figure 1:
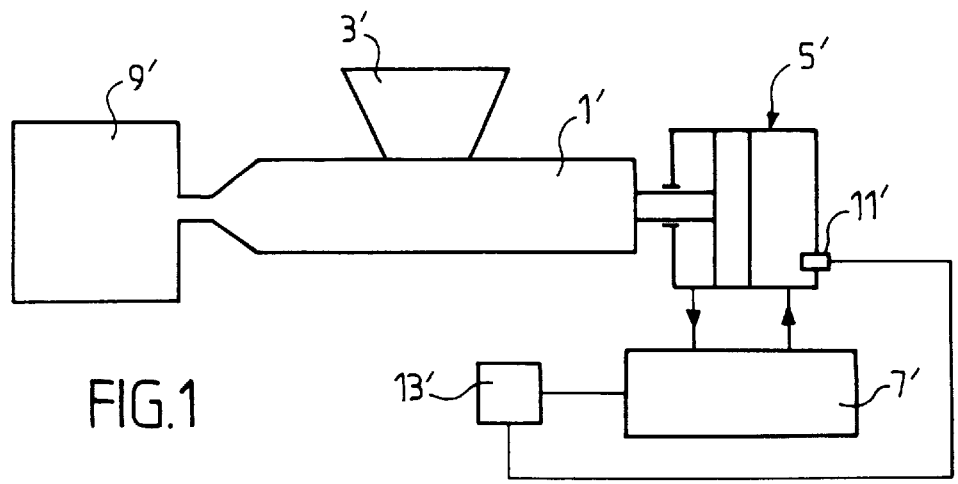
FIG. 1 is a schematic view of an injection assembly in accordance with the prior state of the art.

FIG. 1 shows an injection assembly according to the prior state of the art which is essentially constituted by an injection press 1', a filling hopper 3', intended to ensure supply of raw material to the press, by a hydraulic jack 5', which is actuated by a servovalve 7', and by a mould 9' in which is injected the material emerging from the press 1'.

The injection press 1' is provided with servo-control means essentially constituted by a pressure sensor 11' which is disposed in the body of the hydraulic jack 5', and by a processor 13' which receives on the one hand a reference value of the operating pressure of the press and, on the other hand, the information communicated by the sensor 11', the processor 13' being in communication with the servovalve 7'. Under normal operating conditions, during the process of injection, the processor 13' receives from the sensor 11' the information relative to the hydraulic pressure Ph applied by the jack 5', compares the latter with the reference value which was previously entered in the processor 13', and acts on the servovalve 7' in order that the latter ensures maintenance of the hydraulic pressure $P_h$ at the reference value.

Figure 2:
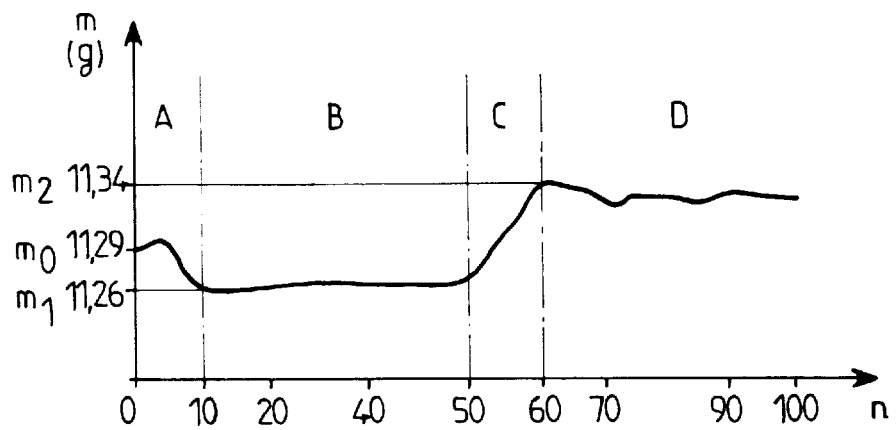
FIG. 2 is a chart which represents the variation of the mass of the pieces obtained by the injection assembly according to the prior state of the art shown in FIG. 1.

FIG. 2 shows a functional chart of an operation of moulding pieces of polypropylene effected with such an injection assembly. This Figure shows the variations of the mass m (expressed in grams) of the moulded pieces as a function of the number n of the pieces produced during this moulding operation. This chart comprises a plurality of zones referenced A to D.

The first zone A corresponds to the step of setting the installation in operation. It is observed that the mass of the pieces produced which, at the beginning, is $m_0=11.29$ g firstly increases, passes through a maximum then decreases to a value $m_1=11.26$ g which is attained after about ten pieces, in the present example, to be stabilized thereafter by a level. One is then in zone B, where the mass $m_1=11.26$ g of the pieces produced remains constant, which corresponds to stable operating conditions of the injection assembly. In this zone B, it is observed that the regulation effected exclusively on the value of the hydraulic pressure $P_h$ of the press 1' is sufficient to ensure, in a given range of tolerances, the regularity of operation of all the assembly.

In practice, it is ascertained that the mass $m_1$ of the pieces produced remains constant as long as no noteworthy disturbance occurs during the process.

However, it is known that, during an injection operation, the machine is subjected, more or less periodically, to various disturbances, such as in particular stoppages, desired or not, particularly for modifying the parameters of injection or for changing the material to be injected, for example in order to modify the colour of the product injected. It has been observed that such disturbances had for their effect to interrupt the stable operating conditions of the machine.

In the example described, such a disturbance has thus been recreated, by replacing, during moulding, after the fiftieth piece, the product introduced in the hopper 3' of the injection press 1' by an identical material (namely polypropylene) but whose index of fluidity passes from 5 to 12. The course of the moulding process was then resumed and one is then found in zone C.

As shown in FIG. 2, it is observed that the mass m of the pieces produced then increases, attaining, at about the sixtieth piece, a new level value $m_2=11.34$ g.

One is then found in zone D, and it is ascertained that, although the mass $m_2$ of the moulded pieces remains constant, this mass is, however, greater than that of the pieces produced in the course of the first level by a value $\Delta m = m_2 - m_1 = 11.34 - 11.26 = 0.08$ g, which represents a relative variation of mass of 1%, which, most of the time, is greater than the acceptable threshold in the industrial domain. This difference $\Delta m$ is in fact such that numerous pieces produced are outside the specifications provided in the specifications sheet and must thus be discarded. It will be so after each of the disturbances which may occur during the process. Apart from the fact that this increase in mass is translated by dimensional variations of the pieces produced which may render them unacceptable, it also implies a non-negligible increase of the raw material consumed, which represents additional costs.

It must thus be agreed upon that the mere regulation of the hydraulic pressure $P_h$ of the injection press 1' is not sufficient to compensate the various disturbances which occur during a moulding operation.

Of course, in practice, as soon as the user observes the increase in weight of the pieces produced, he intervenes on the adjustment of the hydraulic pressure $P_h$ controlling the press to overcome this shortcoming. However, such a modus operandi presents a first drawback which is that of requiring an operator to watch and make a manual intervention, and a second drawback which is that of producing, despite an intervention, however, rapid, pieces which are non-standard since the reactions of the installation occur with a considerable inertia.

The method of regulation according to the invention proposes to overcome this drawback and to render the diagram of distribution of the mass of the pieces produced more regular, even in the case of a disturbance occurring.

The injection assembly according to the invention will be described hereinafter with reference to FIG. 3. This injection assembly is composed of an injection press 1 which is supplied via a filling hopper 3, of a hydraulic jack 5 which is actuated by a servovalve 7 which is itself controlled by a regulation interface 8, and a mould 9 into which the material to be moulded is injected. Computer means 12 provided with an appropriate interface 14 are in a position, on the one hand, to record data coming from various sensors disposed on the injection assembly and, on the other hand, to address the operating orders to the servovalve 7 via the regulation interface 8. Inside the mould 9, there is disposed to that end a plurality of sensors, namely a sensor 15 of the temperature $T_m$ of the material injected and a sensor 17 of the pressure $P_m$ existing in the mould 9. These sensors are connected to an input interface 19 which is connected to the computer means 12, which are constituted in particular by a microcomputer.

The method enabling this injection assembly to be controlled comprises a first step which consists in establishing, for a given product to be moulded, a given equipment and a given specific material to be moulded, relations of correlation of various parameters of the method which have an influence on the geometry of the piece, and in particular the viscosity $\eta$ of the material and the pressure $P_m$ thereof during moulding, either with the mass m of the moulded product or with at least a dimension l of this product. These relations of correlation will be effected experimentally by producing series of specific experiments. The following relations are thus obtained:

$$m=f(\eta) \text{ or } l=f(\eta) \tag{1}$$

$$m=f(P_m) \text{ or } l=f(P_m) \tag{2}$$

From the practical standpoint, the viscosity will be measured from the measurement of the pressure $P_m$ and from the measurement of the temperature $T_m$ of the material inside the mould 9 which are parameters correlated to the viscosity $\eta$. These measurements are effected with the aid of the respective sensors 17 and 15 and their respective values are communicated to the computer means 12 which, by means of specific programs, will establish the value of the viscosity $\eta$.

In a second step of the method according to the invention, a processing will be effected, preferably in the present case a statistical processing, of the different relations of correlation obtained previously, in order to define an analytical model which makes it possible to express the mass of the sample, or a dimension l thereof, by the function:

$$m=f(n,P_m) \text{ or } l=f(n,P_m) \tag{3}$$

In a third step of the method according to the invention, the law of pressure of the injected material is derived from this analytical model, particularly by an inversion thereof. The following function is thus obtained:

$$P_m=f(\eta,m) \text{ or } P_m=f(\eta,l) \tag{4}$$

This function, which represents the pressure which must exist at each injection inside the mould 9 for the mass m of the pieces produced, or a dimension l thereof, to be substantially constants all along production and despite the various disturbances which occur, call of course not be employed directly to control the hydraulic press.

This is why a regulation interface 8 has been called upon, Which has been calibrated so as to apply to the hydraulic jack 5, via the servovalve 7, the hydraulic pressure $P_h$ adequate to obtain a determined pressure of material $P_m$ in the mould 9.

These first three steps of the method are effected before the process of moulding is launched. The measurement of the operating parameters, namely the viscosity $\eta$ and the pressure of the material $P_m$ will then be effected, preferably before each of the pieces is moulded. This operation will preferably be effected in masked time, during the step of filling the mould 9.

Figure 3:
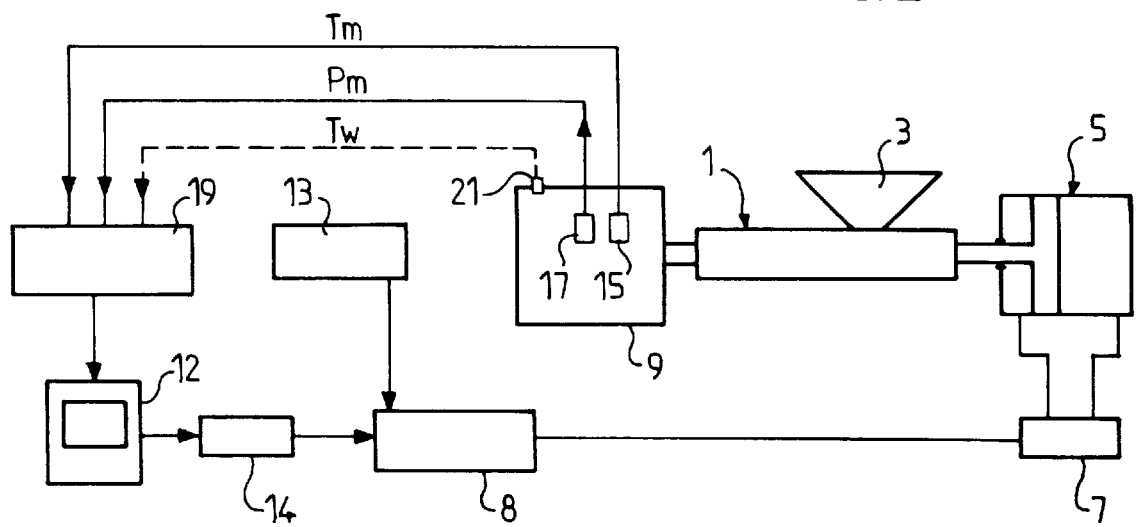
FIG. 3 is a schematic view of an injection assembly according to the invention.
Figure 4:
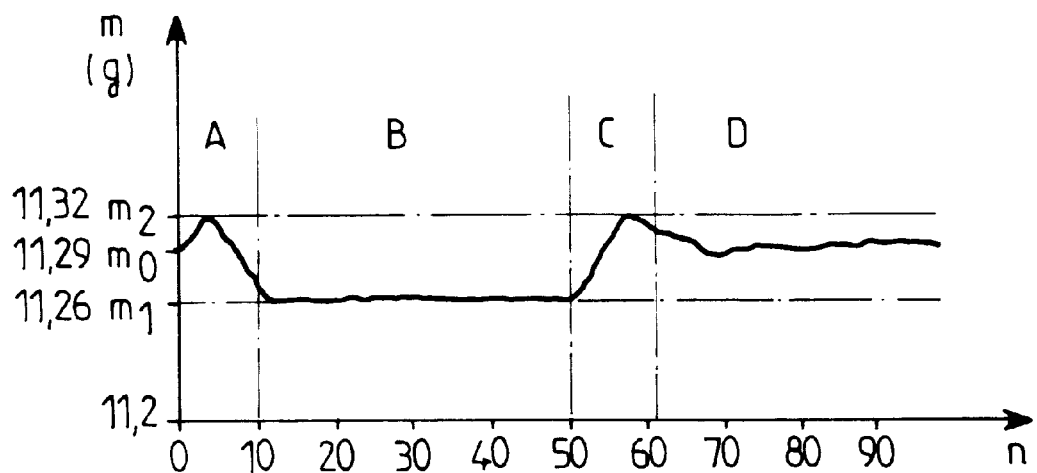
FIGS. 4, 5, 6 and 7 are charts of four embodiments of the invention, represent the variation of the mass of the pieces obtained by the injection assembly according to the invention, shown in FIG. 3.

FIG. 4 shows a sequence chart obtained with the injection assembly shown in FIG. 3 which is of the same type as the chart shown in FIG. 2. This chart therefore shows a process of injection of identical pieces in which, as before, an identical disturbance is made to occur, after the moulding of fifty pieces. It is observed on this characteristic curve that, although the variation of the mass m of the pieces which is produced at the beginning of operation of the press, i.e. during the production of the first ten pieces, is hardly modified, on the other hand the variation $\Delta m=m_m-m_1=11.32-11.26=0.06$ g of the mass of the pieces which is observed between the two levels corresponding to the two modes of stable operation before and after a disturbance, is limited with respect to the prior state of the art. It is thus ascertained that one passes from a level of dispersion of the pieces of 0.08 g to a level of 0.06 g, which represents an improvement of about 25%.

The results furnished by the method according to the invention may be improved by taking other operating parameters into account, and particularly the temperature $T_w$ of the tools used, i.e. principally the temperature of the mould and of the injection means. To that end, there is added to the sensors previously mentioned a sensor 21 (shown in broken lines in FIG. 3) which furnishes to the input interface 19 the temperature $T_w$ of the tools and in particular of the mould 9.

As before, a relation of correlation is established between the temperature of the mould $T_w$ and the mass m, or one of the dimensions l of the moulded product. This relation of correlation is established experimentally. The following relation is thus obtained:

$$m=f(T_w) \text{ or } l=f(T_w) \tag{6}$$

As set forth hereinabove, a processing is then effected, particularly of statistical type, of the different correlations obtained in order to define a new model which integrates the parameter $T_w$ relative to the temperature of the tools:

$$m=f(\eta,P_m,T_w) \text{ or } l=f(\eta,P_m,T_w) \tag{7}$$

As before, the law of pressure of the injected material is derived from this analytical model by inversion thereof. The following function is thus obtained:

$$P_m=f(\eta,m,T_w) \text{ or } P_m=f(\eta,l,T_w) \tag{8}$$

which represents the pressure which must exist at each injection inside the mould 9 for the mass m, or the dimension l, of the pieces produced to be substantially constants, all along production and despite the various disturbances which occur.

Figure 5:
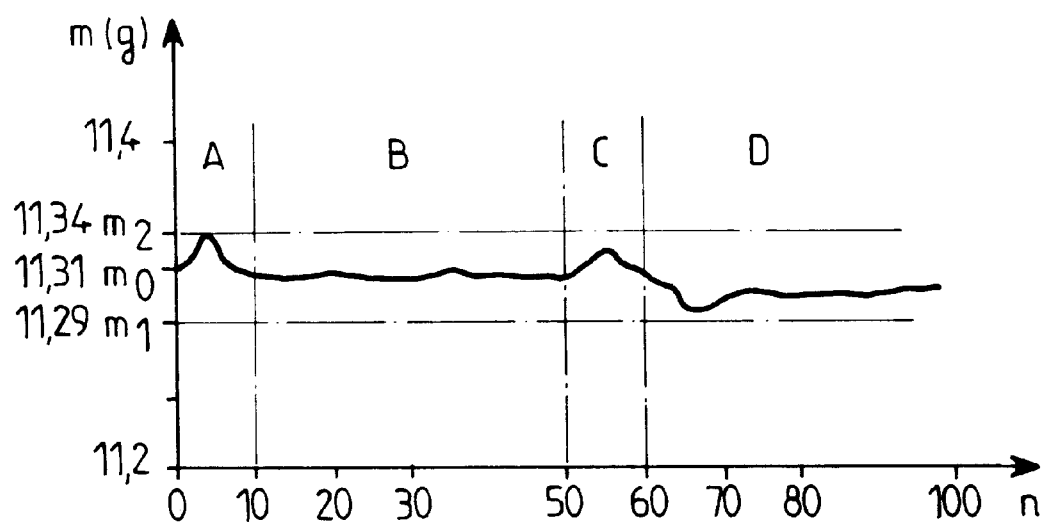

FIG. 5 shows a sequence chart similar to those shown in FIGS. 2 and 4 which shows a process of injection in which, as before a disturbance identical to the preceding ones was made to occur after the moulding of fifty pieces.

On this sequence chart, it is observed that, at the start of operation, there is only a slight variation of mass corresponding to a peak for a mass $m_2=11.34$ g for five pieces manufactured. The mass of the pieces produced then becomes equal to the original mass $m_0$ again, viz. 11.31 g.

It is also observed that the maximum variation of mass which occurs after the disturbance occurring during moulding and which was (after fifty pieces as hereinbefore in the preceding Example) about 0.06 g, or a relative variation of 0.5%, is henceforth only 0.05 g, or a relative variation of 0.4%.

In the light of the results obtained, shown in the charts of FIGS. 2, 4 and 5, the respective standard deviations (S.D.) are established, obtained by the conventional methods and in accordance with the invention.

S.D. by conventional method (FIG. 2) 0.028 g

S.D. by method according to the invention or automatic regulation method (FIG. 4) 0.015 g S.D. by automatic regulation method with correction of temperature of the tools (FIG. 5) 0.009 g The method according to the invention may further be improved by introducing a control loop which makes it possible to introduce in the pressure control law $P_m$ a corrective term of low weight (adaptative method). This corrective term is based on the measurement of the mass of the pieces produced (and/or one of the dimensions of the product).

A control of the mass of the pieces produced is thus effected, in the course of the moulding process, either continuously or periodically, so as to determine the difference of mass $\eta m$ between the mass of the piece and the reference mass $m_0$.

$$\Delta m = (m - m_0) \quad (9)$$

The correlation between $\Delta m$ and $\Delta P_m$, i.e. the variation in pressure which must be imposed on the pressure of material $P_m$ to re-establish a mass equal to the reference value $m_0$, is then established experimentally.

$$\Delta P_m = f(\Delta m) \quad (10)$$

The pressure $P_m$ is thus obtained, i.e. the pressure which must exist inside the mould 9 for the mass m of the pieces produced to be substantially constant, all along the moulding and despite the various disturbances which occur.

Figure 6:
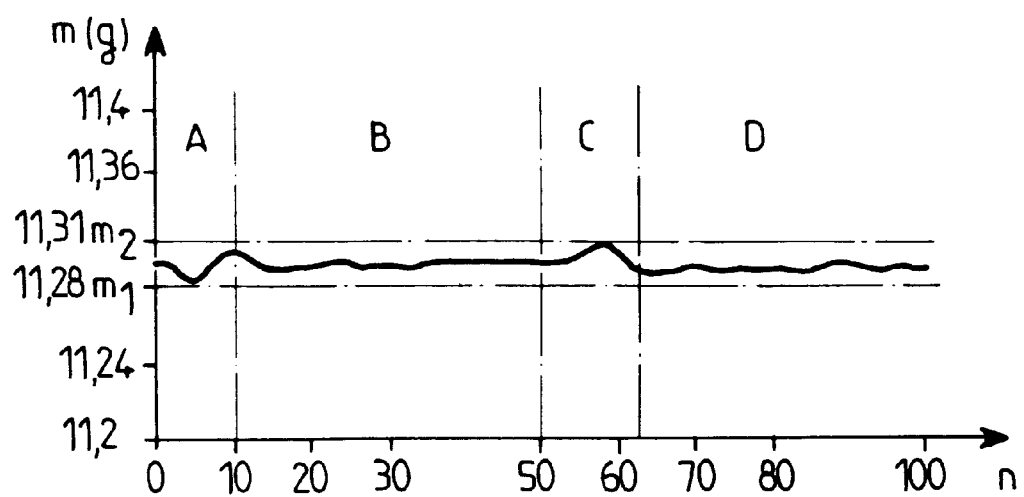

FIG. 6 shows such an embodiment which is expressed by a sequence chart similar to those shown in FIGS. 2, 4 and 5 and which shows a process of injection in which, as before, a disturbance identical to the preceding ones has been made to occur after the moulding of fifty pieces.

If this chart is compared with that of FIG. 5, it is observed that, at the start of operation, the variation in mass is slightly attenuated and that the maximum variation in mass which occurred after the distirbance occurring during moulding and which was about 0.05 g, viz. a relative variation of 0.44%, is henceforth only $\Delta m = m_2 - m_1 = 11.31 - 11.28 = 0.03$ g, viz. a relative variation of about 0.26%.

If the standard deviations are compared, respectively obtained by conventional methods (FIG. 2), by the so-called automatic regulation method (FIG. 4), by the automatic regulation method with correction of temperature (FIG. 5) and by the so-called adaptative method (FIG. 6), S.D. by conventional method (FIG. 2) 0.028 g S.D. by automatic retilation method (FIG. 4) 0.015 g S.D. by automatic regulation method with correction of temperature of the tools (FIG. 5) 0.009 g S.D. by adaptative method (FIG. 6) 0.004 g it is ascertained that the improvement brought, with respect to the conventional methods, by the automatic regulation method is of the order of 65% and when it is completed by the adaptative method, it is of the order of 85%.

Furthermore, the fact of providing, according to the invention, a pressure sensor in the mould 9 is also interesting in that it makes it possible to control correct filling thereof.

Thus, in an embodiment of the invention shown in FIG. 8, the pressure sensor 17 is disposed in the vicinity of the outlet 16 of the nozzle 20 with which the material is injected into the mould 9. In this way, as soon as the sensor 17 indicates a rise in pressure, this means that the material injected in the mould compresses the latter and therefore that the mould is filled with material.

According to the invention, as shown in FIG. 9, the pressure sensor 17 may also be disposed, not in the mould 9 but inside the injection nozzle 20, in the vicinity of the outlet 16 thereof. As shown in FIG. 10, the sensor 16 may also be disposed in the nose of the injection press 1, downstream of the injection screw 25 and the non-return valve 27 thereof. Such embodiments are particularly interesting in that they make it possible to control the pressure of the material without it being necessary to arrange the sensor 7 inside the mould 9, which is technically interesting as a press may thus be provided which comprises the regulation control assembly.

These means for detecting the end of the step of filling the mould may preferably be in communication with delay means which they trigger off as soon as the mould 9 is filled.

Such delay means are interesting in that they enable the assembly of the electronic means ensuring control of the process of moulding to re-initialize. The necessity of such a re-initialization is all the greater when one passes, as is usually the case, from a regulation logic set on the speed (during the phase of filling of the mould) to a regulation logic set on the pressure (during the phase of maintenance under compression).

A process of regulation of a moulding assembly has been described hereinbefore which is produced from the pressure $P_m$ of the material injected in the mould, or in a zone close thereto. However, the present invention may also be carried out from the force of injection which, in this particular case, goes back to the control of the hydraulic pressure $P_h$ which is applied to the material to be injected. To that end, the following relations are established as before, in experimental or analytical manner:

$$m = f(\eta) \text{ or } l = f(\eta) \quad (1')$$

$$m = f(P_h) \text{ or } l = f(P_h) \quad (2')$$

then $$m = f(n, P_h) \quad (3')$$

and finally the function $P_h$ which represents the hydraulic pressure to be applied to the material for the mass m of the pieces produced or at least one of their dimensions to be substantially constant, all along the production and despite the various disturbances which occur:

$$P_h = f(\eta, m) \quad (4')$$

Figure 7:
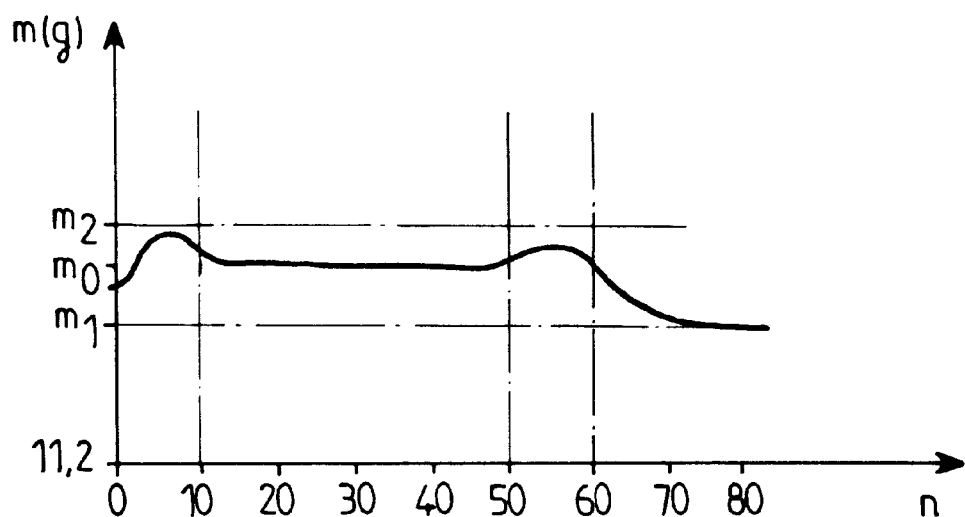

FIG. 7 shows a sequence chart of the same type as those shown hereinbefore. It is observed thereon that the variation $\Delta m = m2 - m1 = 11.32 - 11.26 = 0.06$ g of the mass of the pieces which is observed between two stable modes of operation before and after a disturbance is limited with respect to the prior state of the art. It is thus observed that one passes from a level of dispersion of the pieces of 0.08 g to a level of 0.06 g, which represents an improvement of about 25%.

As before, it is of course possible to apply the correction due to the temperature $T_w$ of the tools $P_h = f(\eta, m, T_w)$ possibly completed by the corrective term coming from the continuous or regular control of the mass m of the pieces produced, or of at least one of their dimensions.

We claim:

1. Method for controlling and regulating an injection moulding press of a polymeric material, said press being actuated by means adapted to exert on the material to be moulded an injection force, which essentially comprises a filling phase during which the material to be moulded is introduced in the mould, and a subsequent maintenance phase under pressure during which a determined pressure is applied to the material, the method comprising the following steps:

establishing respective relations of correlation between the mass, and at least one of the dimensions, of a product moulded with at least certain operating parameters of the press, said operating parameters including the viscosity of the material in the mould, or a parameter correlated therewith, and either the pressure of the material in the mould, or the injection pressure generating the injection force;

statistically processing the correlation relations, in order to define an analytical model expressing the mass and said dimension, of the moulded product as a function of said operating parameters;

deriving from said analytical model a force control law which must be applied by the press to the material contained in the mould during the maintenance phase as a function of the pressure of the material in the mould, or of the injection pressure;

measuring at each cycle of injection the operating parameters of the press; and controlling the maintenance force applied by the press to the material during the maintenance phase from said analytical model.

2. Method according to claim 1, wherein the steps of establishing the relations of correlations, of statistically processing the relations of correlations, and of deriving the force control law are effected prior to the moulding operations.

3. Method according to claim 1, wherein the operations for measuring the operating parameters of the press are effected during the filling phase.

4. Method according to claim 1, further comprising taking into account the temperature of tools as an additional operating parameter.

5. Method according to claim 1, further comprising controlling during moulding, at least one of the mass of moulded products and said dimension; establishing a relation of correlation between one of a variation of the mass of said products, and said dimension, with respect to a reference value with either the pressure of the material in the mould, or the injection pressure so as to bring to the law for controlling the maintenance force a correction term.

6. In a device for controlling and regulating an injection moulding press of a polymeric material, said press being actuated by means adapted to exert on the material to be moulded an injection force, so as to carry out a filling phase during which the material is introduced in the mould via an injection nozzle, followed by a maintenance phase under pressure during which a determined pressure is applied to the material, the improvement wherein the device further comprises detecting means for detecting the end of filling phase, said detecting means being adapted to set the maintenance phase under pressure to work; and delay means triggered off by the detecting means for detecting the end of filling phase, said delay means being adapted to set the maintenance phase under pressure to work.

7. Device according to claim 6, further comprising measuring means for measuring the pressure of the material in the mould, said measuring means being located in a zone close to a point of injection of the material therein.

8. Device according to claim 6, further comprising measuring means for measuring the pressure of the material, said measuring means being disposed inside the injection nozzle in a zone close to its outlet.

9. Device according to claim 6, further comprising measuring means for measuring the pressure of the material in the mould, said measuring means being located upstream inside a head of the injection press and downstream of a non-return valve.

* * * * *